United States Patent
Tobari et al.

(10) Patent No.: US 8,344,671 B2
(45) Date of Patent: Jan. 1, 2013

(54) SPEED CONTROLLER OF MAGNETIC MOTOR

(75) Inventors: Kazuaki Tobari, Hitachiota (JP); Yasuo Notohara, Hitachiota (JP); Wataru Hatsuse, Mito (JP); Dongsheng Li, Hitachi (JP); Kentaro Oi, Hitachinaka (JP); Yuuji Funayama, Ohira (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 515 days.

(21) Appl. No.: 12/635,855

(22) Filed: Dec. 11, 2009

(65) Prior Publication Data

US 2010/0148707 A1 Jun. 17, 2010

(30) Foreign Application Priority Data

Dec. 12, 2008 (JP) ................................. 2008-316348

(51) Int. Cl.
*H02P 21/00* (2006.01)

(52) U.S. Cl. ..................... 318/400.02; 318/609; 318/610

(58) Field of Classification Search .................. 318/609, 318/610, 400.02

See application file for complete search history.

(56) References Cited

U.S. PATENT DOCUMENTS

| | | | | |
|---|---|---|---|---|
| 6,492,788 B1* | 12/2002 | Agirman et al. | ............... | 318/700 |
| 6,677,724 B1* | 1/2004 | Kim et al. | .................... | 318/700 |
| 7,271,562 B2* | 9/2007 | Lee et al. | ...................... | 318/609 |
| 2001/0026140 A1* | 10/2001 | Ishida | ........................... | 318/727 |
| 2008/0048606 A1* | 2/2008 | Tobari et al. | .................. | 318/801 |
| 2008/0061726 A1* | 3/2008 | Iwaji et al. | ..................... | 318/723 |
| 2008/0300820 A1* | 12/2008 | Hu | ............................... | 702/147 |

FOREIGN PATENT DOCUMENTS

| | | |
|---|---|---|
| JP | 2005-033957 | 2/2005 |
| KR | 10-2002-0047169 | 6/2002 |
| KR | 10-2007-0051572 | 5/2007 |

\* cited by examiner

*Primary Examiner* — Rina Duda

(74) *Attorney, Agent, or Firm* — Antonelli, Terry, Stout & Kraus, LLP.

(57) ABSTRACT

The invention relates to a speed control method of a magnetic motor and is capable of providing a speed controller of the magnetic motor realizing highly stable, highly efficient and highly responsive control characteristics even around critical torque of the motor. When an excessive torque command value (or a q-axis commanded current value) greater than a torque maximum value (or a q-axis current) that can be outputted by the motor is required, an input of speed control is limited so that the q-axis commanded current value does not increase up to a limit value.

13 Claims, 10 Drawing Sheets

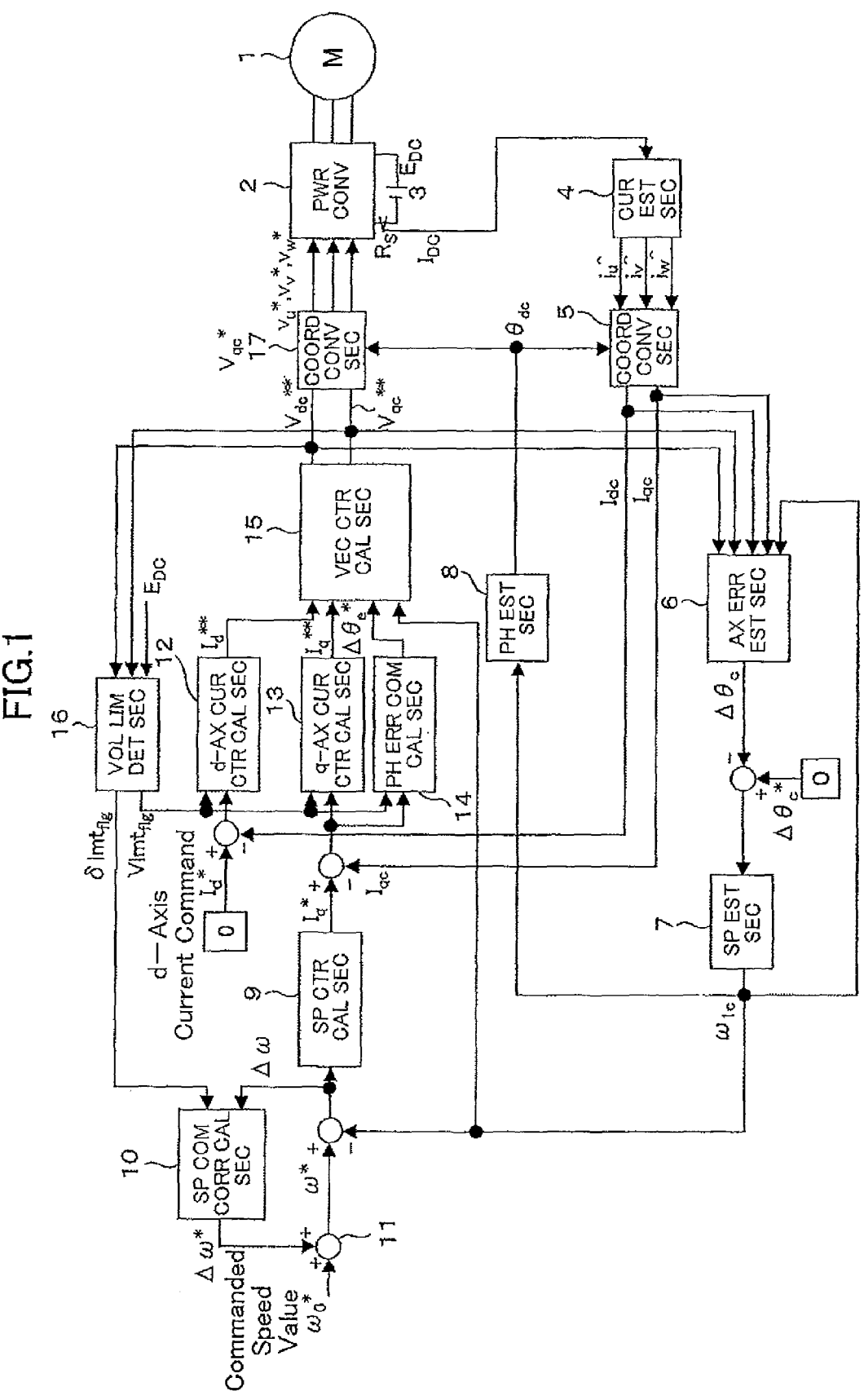

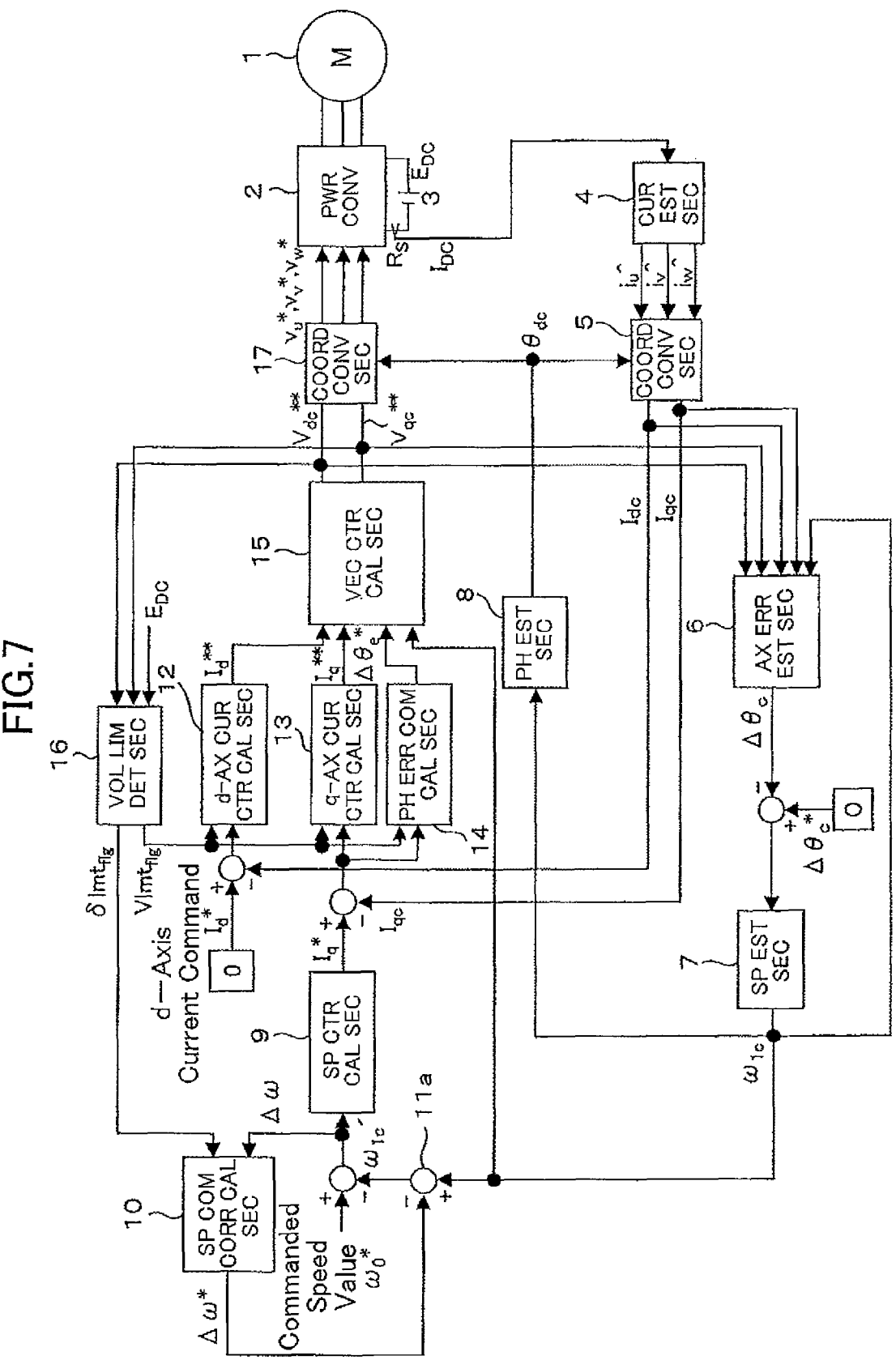

SPEED CONTROLLER OF MAGNETIC MOTOR

CROSS REFERENCE TO RELATED APPLICATIONS

This application claims the foreign priority benefit under Title 35, United States Code, §119 (a)-(d) of Japanese Patent Application No. 2008-316348, filed on Dec. 12, 2008 in the Japan Patent Office, the disclosure of which is herein incorporated by reference in its entirety.

BACKGROUND OF THE INVENTION

1. Field of the Invention

The present invention relates to a technology for controlling speed of a magnetic motor.

2. Related Art

As a technology for driving a magnetic motor in a high rotation speed range, Japanese Patent Application Laid-open No. 2005-033957 describes a protective control method of calculating a voltage saturation rate standing for a degree of voltage saturation, from an input voltage inputted to a power converter for driving the magnetic motor and a commanded voltage value given to the magnetic motor and of lowering a target rotation speed value given from the outside until when the voltage saturation rate becomes smaller than a voltage saturation rate preset value.

On the other hand, this method described in JPA 2005-033957 has a problem which results from its control principle, the problem that the maximum use can not be made of the voltage saturation rate because this method requires the voltage saturation rate to be set smaller than the preset voltage saturation rate value.

That is, this method has a problem that the maximum voltage of the power converter cannot be applied to the motor and as a consequence, the maximum use can not be made of the upper limit torque of the motor.

SUMMARY OF THE INVENTION

In order to work out the problem above mentioned, the present invention aims at providing a speed controller of a permanent magnetic motor, an air conditioner and a screw compressor capable of making the maximum use of the voltage saturation rate and completing a controller of a magnetic motor, an air-conditioner and a screw compressor which are capable of operating with high stability, high efficiency and quick response upto the upper limit torque of the motor.

The present invention is characterized in that if a phase angle between commanded voltage values of d-axis (magnetic flux axis) and q-axis (torque axis) of vector control increases to a predetermined value or more, an input of speed control is limited so that a q-axis commanded current value that is an output of the speed control does not increase to an upper limit value.

In order to solve the abovementioned problems, the present invention has a first feature of a speed controller of a magnetic motor for: calculating d-axis and q-axis commanded voltage values, the d-axis and the q-axis corresponding respectively to a magnetic flux axis and a torque axis, and the d-axis and q-axis commanded voltage values being calculated based on d-axis and q-axis commanded current values, d-axis and q-axis detected current values and a detected speed values, the d-axis commanded current value set to zero and the q-axis commanded current value calculated from a deviation of a commanded speed value from the detected speed value, and controlling an output voltage value from a power converter for driving the magnetic motor in accordance with the calculated d-axis and q-axis commanded voltage values, the speed controller limiting a speed control input to keep the q-axis commanded current value from increasing to an upper limit value if a commanded torque value to request a greater torque than a maximum torque is requested, the commanded torque value corresponding to the q-axis commanded current value and the maximum torque which corresponds to the maximum detected q-axis current and can be outputted by the magnetic motor.

Still more, the present invention has a second feature of a speed controller of a magnetic motor for: calculating d-axis and q-axis commanded voltage values, the d-axis and the q-axis corresponding respectively to a magnetic flux axis and a torque axis, and the d-axis and q-axis commanded voltage values being calculated based on d-axis and q-axis commanded current values, d-axis and q-axis detected current values and a detected speed values, the d-axis commanded current value set to zero and the q-axis commanded current value calculated from a deviation of a commanded speed value from the detected speed value, and controlling an output voltage value from a power converter for driving the magnetic motor by changing a commanded phase value in accordance with a deviation of the q-axis commanded current value from the q-axis detected current value if the output voltage value from the power converter is limited, the speed controller limiting a speed control input to keep the q-axis commanded current value from increasing to an upper limit value if a commanded torque value to request a greater torque than a maximum torque is requested, the commanded torque value corresponding to the q-axis commanded current value and the maximum torque which corresponds to the maximum q-axis detected current and can be outputted by the magnetic motor Moreover the present invention has a third feature of a speed controller of a magnetic motor comprising a speed control calculation section to which a second commanded speed value is inputted to limit the speed control input, the second commanded speed value being equal to what is left after subtracting a speed correction value from a first commanded speed value given by an upper level section, the speed correction value being calculated to have the second commanded speed value equal to the detected speed value.

Moreover the present invention has a fourth feature of a speed controller of a magnetic motor comprising a speed control calculation section to which a second detected speed value is inputted to limit the speed control input, the second detected speed value being equal to a summation of the detected speed value and a speed correction value being calculated so as to have the second detected speed value equal to the first commanded speed value.

Moreover the present invention has a fifth feature of a speed controller of a magnetic motor wherein the speed correction value is generated by proportion and integration calculations of a deviation of the second commanded speed value to be inputted to the speed control calculation section from the detected speed value or a deviation of the first commanded speed value from the second detected speed value.

Moreover the present invention has a sixth feature of a speed controller of a magnetic motor wherein if the deviation of the commanded speed value from the detected speed value is a positive value, the deviation is made zero with the positive value skipped, the deviation which is to be inputted to the speed control calculation section where calculation on integration control or the proportion and integration control is performed.

Moreover the present invention has a seventh feature of a speed controller of a magnetic motor wherein the speed controller determines that the greater torque than the maximum torque is applied if a phase angle between the d-axis commanded voltage value and the q-axis commanded voltage value is equal to or greater than 70 degrees.

Moreover the present invention has a eighth feature of a speed controller of a magnetic motor wherein the speed controller determines that the output voltage value from the power converter is limited if a ratio of an average value on the output voltage values to a DC voltage value is substantially 1.

Moreover the present invention is an air conditioner to which a speed controller of a magnetic motor with the first feature is applied.

Moreover the present invention is a screw compressor to which a speed controller of a magnetic motor with the first feature is applied.

Thus the invention is capable of providing the speed controller of the permanent magnetic motor capable of keeping the high stability, high efficiency and quick response even when the motor is outputting the upper limit torque.

BRIEF DESCRIPTION OF DRAWINGS

FIG. 1 is a block diagram illustrating a configuration of a speed controller of a magnetic motor according to one embodiment of the invention.

FIG. 7 is a block diagram illustrating a configuration of a speed controller of a magnetic motor according to another embodiment of the invention.

DETAILED DESCRIPTION

Figure 2A:
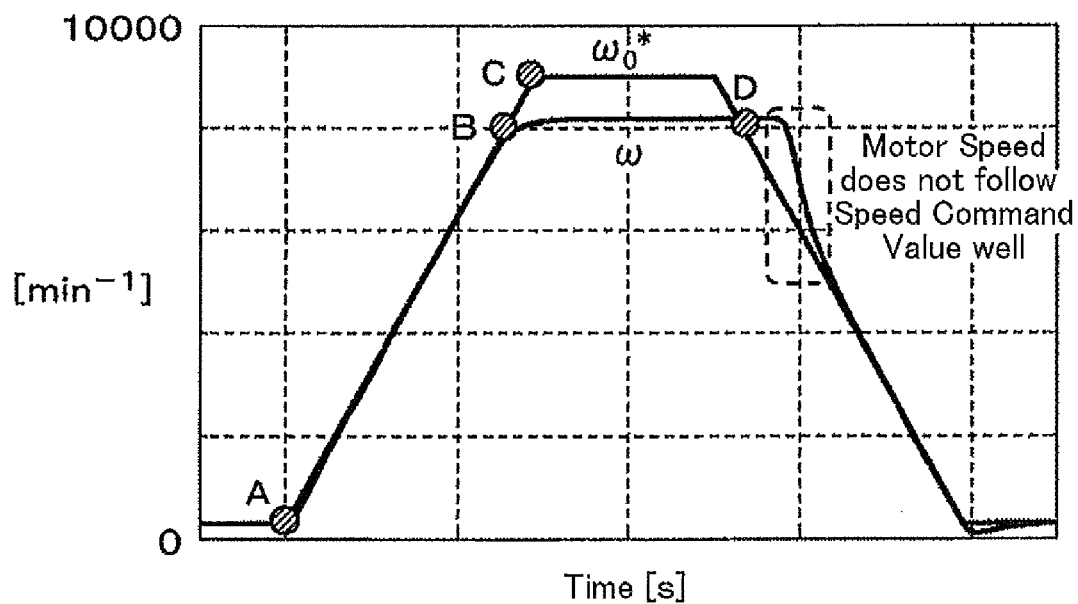
FIG. 2A shows a waveform of the estimated speed value when a trapezoidal wave signal of the commanded speed value is applied, if the present invention is not employed.

Embodiments of the invention will be explained in detail below with reference to the drawings.

First Embodiment

FIG. 1 is a block diagram illustrating a configuration of a speed controller of a magnetic motor according to one embodiment of the invention.

The magnetic motor (M) 1 outputs motor torque in which a torque component caused by magnetic flux of a permanent magnetic and a torque component caused by inductance of an armature coils are combined.

A power converter (PWR CONV) 2 outputs voltages which are proportional to three-phase commanded AC voltage values $V_U^*$, $V_V^*$ and $V_W^*$, and varies the output voltages and rotational speed of the magnetic motor 1.

A DC power supply (DC PWR SUP) 3 supplies DC voltage $E_{DC}$ to the power converter 2.

A current estimating section (CUR EST SEC) 4 reproduces the three-phase AC currents ($i_U$, $i_V$, $i_W$) from the DC current $I_{DC}$ flowing through one-shunt resistance $R_S$ attached to detect an over-current of the power converter 2 and outputs $i_U\hat{}$, $i_V\hat{}$ and $i_W\hat{}$.

A coordinate converting section (COORD CONV SEC) 5 calculates and outputs detected current values $I_{dc}$ and $I_{qc}$ of d and q-axes by using the reproduced values of the three-phase AC currents $i_U\hat{}$, $i_V\hat{}$ and $I_W\hat{}$ described above and an estimated phase value $\theta_{dc}$.

An axial error estimating section (AX ERR EST SEC) 6 performs estimate-calculation of an axial error $\Delta\theta$ that is a deviation between the estimated phase value $\theta_{dc}$ and a phase value $\theta_d$ of the motor and outputs an estimated value $\Delta\theta_c$ based on commanded voltage values $V_{dc}^{}$ and $V_{qc}^{}$, an estimated speed value $\omega_{1c}$, detected current values $I_{dc}$ and $I_{qc}$ and a motor constant.

A speed estimating section (SP EST SEC) 7 performs both proportion calculation and integration calculations of a deviation between a command value of the axial error $\Delta\theta$ and the estimated value of the axial error $\Delta\theta$ and outputs an estimated speed value $\omega_{1c}$.

A phase estimating section (PH EST SEC) 8 integrates the estimated speed value $\omega_{1c}$ and outputs an estimated phase value $\theta_{dc}$.

A speed control calculation section (SP CTR CAL SEC) 9 performs both proportion and integration calculations so that the estimated speed value $\omega_{1c}$ follows a second commanded speed value $\omega^*$ and outputs a q axis commanded current value $I_q^*$.

A speed command correction calculating section (SP COM CORR CAL SEC) 10 outputs a speed correction value $\Delta\omega^*$ based on the speed deviation value $\Delta\omega$ between the second commanded speed value $\omega^*$ and the estimated speed value $\omega_{1c}$ and a voltage phase limiting flag $\delta lmt_{flg}$.

An adding section (ADD SEC) 11 adds the speed correction value $\Delta\omega^*$ to the first commanded speed value $\omega_0^*$ given from an upper level to output a second commanded speed value $\omega^*$.

A d-axis current control calculation section (d-AX CUR CTR CAL SEC) 12 operates as follows depending on the voltage value limiting flag $Vlmt_{flg}$. That is, when the voltage value limiting flag $Vlmt_{flg}$ is "zero", the d-axis current control calculation section 12 performs both proportion and integration calculations so that the detected current value $I_{dc}$ of the d-axis follows the first d-axis commanded current value $I_d^*$ to calculate $\Delta I_d^{}$ and outputs a second d-axis commanded current value $I_d^{}$.

When the voltage value limiting flag $Vlmt_{flg}$ is "1", the d-axis current control calculation section 12 holds and outputs the previous value without updating $\Delta I_d^{**}$.

A q-axis current control calculation section (q-AX CUR CTR CAL SEC) 13 operates as follows depending on the voltage value limiting flag $Vlmt_{flg}$.

When the voltage value limiting flag $Vlmt_{flg}$ is "zero", the q-axis current control calculation section 13 performs both proportion and integration calculations so that the detected current value $I_{qc}$ of the q-axis follows the first q-axis commanded current value $I_q^*$ that is the output of the speed control calculation section 9 to calculate $\Delta I_q^{}$ and outputs as a second q-axis commanded current value $I_q^{}$.

When the voltage value limiting flag $Vlmt_{flg}$ is "1", the q-axis current control calculation section 13 holds the previous value without updating $\Delta I_q^{**}$, adds to $I_q^*$ and outputs a second q-axis commanded current value $I_q^{**}$.

A phase error command calculating section (PH ERR COM CAL SEC) 14 operates as follows depending on the voltage value limiting flag $Vlmt_{flg}$.

When the voltage value limiting flag $Vlmt_{flg}$ is "zero", the phase error command calculating section 14 outputs a command value of phase error $\Delta\theta_e$ as "zero".

When the voltage value limiting flag $Vlmt_{flg}$ is "1", the phase error command calculating section 14 performs proportion and integration calculations so that the detected current value $I_{qc}$ of the q-axis follows the first q-axis commanded current value $I_q^*$ that is the output of the speed control calculation section 9 and outputs a command value of the phase error $\Delta\theta_e^*$.

A vector control calculation section (VEC CTR CAL SEC) 15 calculates and outputs commanded voltage values $V_{dc}^{}$ and $V_{qc}^{}$ based on an electric constant of the magnetic motor 1, the second commanded current values $I_d^{}$ and $I_q^{}$, the estimated speed value $\omega_{1c}$ and the command value of the phase error $\Delta\theta_e$.

A voltage limit detecting section (VOL LIM DET SEC) 16 outputs the voltage value limiting flag $Vlmt_{flg}$ and the voltage phase limiting flag $\delta lmt_{flg}$ based on the commanded voltage values $V_{dc}^{}$ and $V_{qc}^{}$ of the d-axis and q-axis and the DC voltage value $E_{DC}$.

A coordinate converting section (COORD CONV SEC) 17 outputs commanded voltage values of three-phase AC $V_u^{}$, $V_v^{}$ and $V_w^{}$ by using the d-axis and q-axis commanded voltage values $V_{dc}^{}$ and $V_{qc}^{**}$ and the estimated position value $\theta_{dc}$.

Next, basic operations of voltage control and phase control of a basic vector control method will be explained.

The basic operation of the voltage control is carried out by the voltage limit detecting section 16 in FIG. 1 that calculates a voltage value $V^*$ by using the d-axis and q-axis commanded voltage values $V_{dc}^{}$ and $V_{qc}^{}$ according to the following Equation 1.

$$V^* = \sqrt{V_{dc}^{2} + V_{qc}^{2}} \qquad \text{Eq. 1}$$

Still more, the voltage value limiting flag $Vlmt_{flg}$ is generated by using $V^*$ and the DC voltage value $E_{DC}$ according to the following Equation 2.

$$\begin{pmatrix} 1/2 \cdot E_{DC} > V^* : Vlmt_{flg} = 0 \\ 1/2 \cdot E_{DC} \leq V^* : Vlmt_{flg} = 1 \end{pmatrix} \qquad \text{Eq. 2}$$

The d-axis and q-axis current control calculation sections 12 and 13 output the second commanded current values $I_d^{}$ and $I_q^{}$ so that the detected current values $I_{dc}$ and $I_{qc}$ follow respectively the first commanded current values $I_d^*$ and $I_q^*$ according to the following Equation 3.

$$\begin{pmatrix} I_d^{**} = I_d^* + \Delta I_d^{} \\ I_q^{} = I_q^* + \Delta I_q^{**} \end{pmatrix} \qquad \text{Eq. 3}$$

The vector control calculation section 15 calculates the commanded voltage values $V_{dc}^{}$ and $V_{qc}^{}$ by using the second commanded current values $I_d^{}$ and $I_q^{}$, the constant of the magnetic motor 1 and the estimated speed value $\omega_{1c}$ according to the following Equation 4.

$$\begin{bmatrix} V_{dc}^* \\ V_{qc}^* \end{bmatrix} = \begin{bmatrix} R^* & -\omega_{1c} \cdot L_q^* \\ \omega_{1c} \cdot L_d^* & R^* \end{bmatrix} \cdot \begin{bmatrix} I_d^{} \\ I_q^{} \end{bmatrix} + \begin{bmatrix} 0 \\ \omega_1 \cdot K_e^* \end{bmatrix} \qquad \text{Eq. 4}$$

Where, R is a resistance value, $L_d$ is an inductance value of the d-axis, $L_q$ is an inductance value of the q-axis, $K_e$ is a coefficient of induced voltage and * is a preset value.

The vector control calculation section 15 also calculates new commanded voltage values $V_{dc}^{}$ and $V_{qc}^{}$ by using Equation 4 and the command value of the phase error $\Delta\theta_e^*$ according to Equation 5 to control the output voltage of the power converter 2.

$$\begin{bmatrix} V_{dc}^{} \\ V_{qc}^{} \end{bmatrix} = \begin{bmatrix} V_{dc}^* \\ V_{qc}^* \end{bmatrix} \cdot \begin{bmatrix} \cos\Delta\theta_e^* & -\sin\Delta\theta_e^* \\ \sin\Delta\theta_e^* & \cos\Delta\theta_e^* \end{bmatrix} \qquad \text{Eq. 5}$$

This control method enables performing "field-weakening control" intended for enlarging a high speed torque range by using the command value of the phase error $\Delta\theta_e^*$ while $I_d^*$ is kept set to "zero".

The use of this method allows the voltage saturation rate to be used to its limit.

Meanwhile, the prior art phase control basic operations are carried out as follows. That is, the axial error estimating section 6 performs estimate calculation of an axial error value $\Delta\theta$ ($=\theta_{dc}-\theta_d$) that is a deviation between an estimated phase value $\theta_{dc}$ and a motor phase value $\theta_d$ by using the commanded voltage values $V_{dc}^{}$ and $V_{qc}^{}$, the detected current values $I_{dc}^{**}$ and $I_{qc}$, the estimated speed value $\omega_{1c}$ and the constant of the magnetic motor 1 according to Equation 6.

$$\Delta\theta_c = \tan^{-1}\left[\frac{V_{dc}^{**} - R^* \cdot I_{dc} + \omega_{1c} \cdot L_q^* \cdot I_{qc}}{V_{qc}^{**} - R^* \cdot I_{qc} - \omega_{1c} \cdot L_q^* \cdot I_{dc}}\right] \qquad \text{Eq. 6}$$

The speed estimating section 7 also performs both proportion and integration calculations to control the estimated speed value $\omega_{1c}$ so that the axial error estimated value $\Delta\theta$ becomes "zero".

The phase estimating section 8 integrates the estimated speed value $\omega_{1c}$ to control the estimated phase value $\theta_{dc}$.

The basic operation for voltage control and phase control in the present invention is explained as above mentioned.

Next is to be explained the control characteristics of the speed controller of the present invention when "the speed command correction calculating section 10" of the invention is not used ($\Delta\omega^*=0$).

Figure 2B:
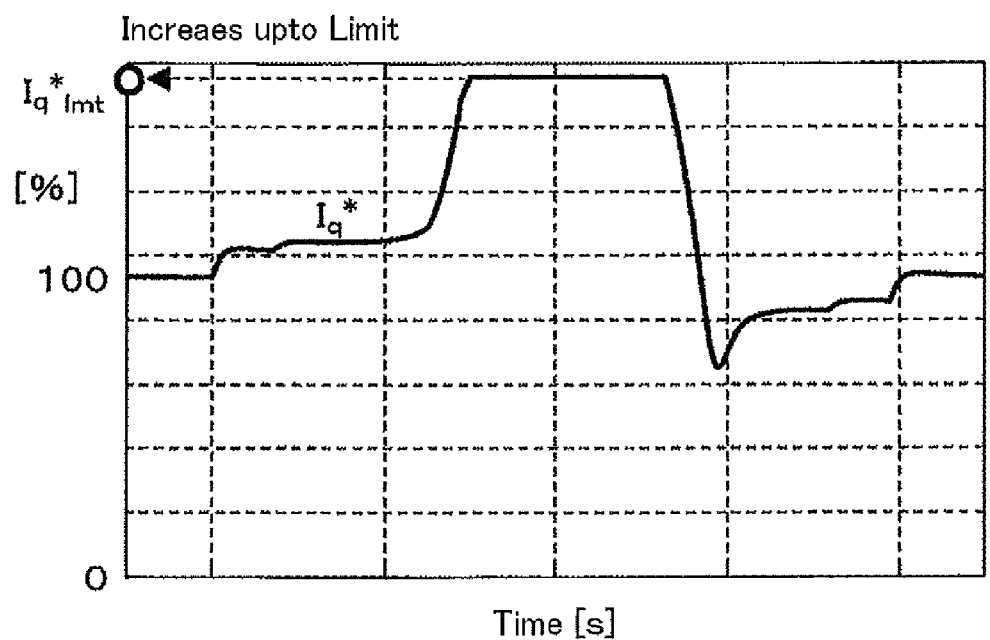
FIG. 2B shows a waveform of the q-axis commanded current value when a trapezoidal wave signal of the commanded speed value is applied, if the present invention is not employed.

FIG. 2 shows operation characteristics when a trapezoidal wave signal of the commanded speed value $\omega^*$ is given.

This is a state when acceleration and deceleration operations are carried out in a state while a load torque for 100% is being applied.

FIG. 2A shows waveforms of the first commanded speed value $\omega_0^*$ and the estimated speed value $\omega_{1c}$ and the lower part the figure shows a waveform of the q-axis commanded current value $I_q^*$.

In the figure, while the commanded speed value $\omega_0^*$ is increased from a point A to a point C with a predetermined acceleration rate, the speed $\omega$ stagnates at a point B in the middle of acceleration.

This means that the load torque for 100% cannot be applied in a speed range over the point B while the output of the magnetic motor 1 increases to the upper limit torque.

Accordingly, if the commanded speed value $\omega_0^*$ is decelerated, the speed $\omega$ starts to follow $\omega_0^*$ again. However, since the speed deviation value $\Delta\omega$ is always generated during the period during which the output of the magnetic motor 1 stays at the upper limit torque, $I_q^*$ diverges to a limit value $I_{q\ max}^*$ due to the integral operation of the speed control calculation section 9. Therefore, there is a problem with the speed following characteristic degrading around a point D.

The following characteristic may be worsened even more if a control gain of the speed control calculation section 9 is low, which possibly results in a shutdown due to an over-current trip.

Next, "the speed command correction calculating section 10" and "the voltage limit detecting section 16" which are the features of the invention will be explained.

When the magnetic motor 1 reaches the critical torque, it becomes possible to quickly reduce the commanded speed value $\omega_0^*$ to the speed $\omega$ and to prevent the q-axis commanded current value $I_q^*$ from diverging by adding these two sections.

Figure 3:
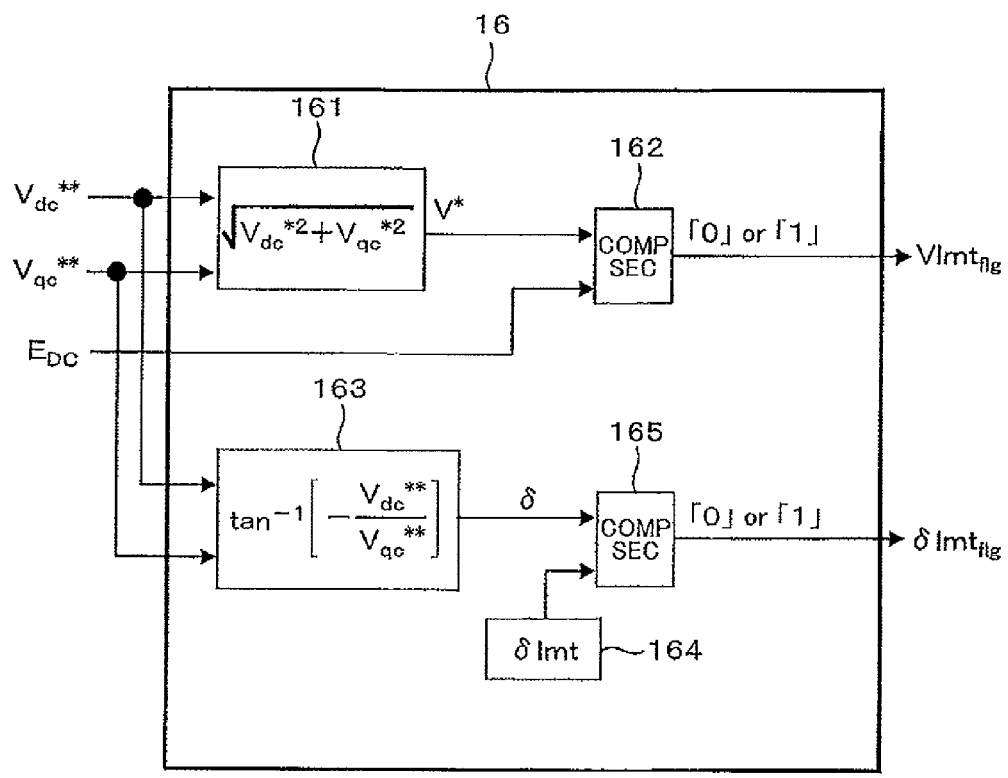
FIG. 3 is a block diagram showing a voltage limit detecting section of the invention.

The voltage limit detecting section 16 shown in FIG. 3 will be explained.

The following signals are generated by using the d-axis and q-axis commanded voltage values $V_{dc}^{}$ and $V_{qc}^{}$ and the DC voltage value $E_{DC}$:

(1) The signal used for switching to field-weakening control is $Vlmt_{flg}$
If $Vlmt_{flg}$="0", ordinary current control is performed;
If $Vlmt_{flg}$="1",: field-weakening control is performed;

(2) Signal for detecting that the magnetic motor 1 outputs the upper limit torque:$\delta lmt_{flg}$
If $\delta lmt_{flg}$="0",: the output torque is less than the upper limit torque;
If $\delta lmt_{flg}$="1",: the output torque is the upper limit torque.

The commanded voltage values $V_{dc}^{}$ and $V_{qc}^{}$ are inputted to an output voltage calculating section 161 to calculate a signal $V^*$ according to the following Equation 7.

$$V^* = \sqrt{V_{dc}^{2} + V_{qc}^{2}} \qquad \text{Eq. 7}$$

This signal $V^*$ and the signal $E_{DC}$ are inputted to a comparing section 162 that outputs the voltage value limiting flag $Vlmt_{flg}$ of "0" or "1" according to Equation 1 described above.

The commanded voltage values $V_{dc}^{}$ and $V_{qc}^{}$ are inputted also to a voltage phase calculating section 163 that calculates a voltage phase $\delta$ that is a phase angle between the commanded voltage values $V_{dc}^{}$ and $V_{qc}^{}$ according to the following Equation 8.

$$\delta = \tan^{-1}\left[-\frac{V_{dc}^{}}{V_{qc}^{}}\right] \qquad \text{Eq. 8}$$

A signal $\delta lmt$ 164 indicates a value of the voltage phase during the critical torque.

The signal $\delta lmt$ 164 will be explained below.

Figure 4:
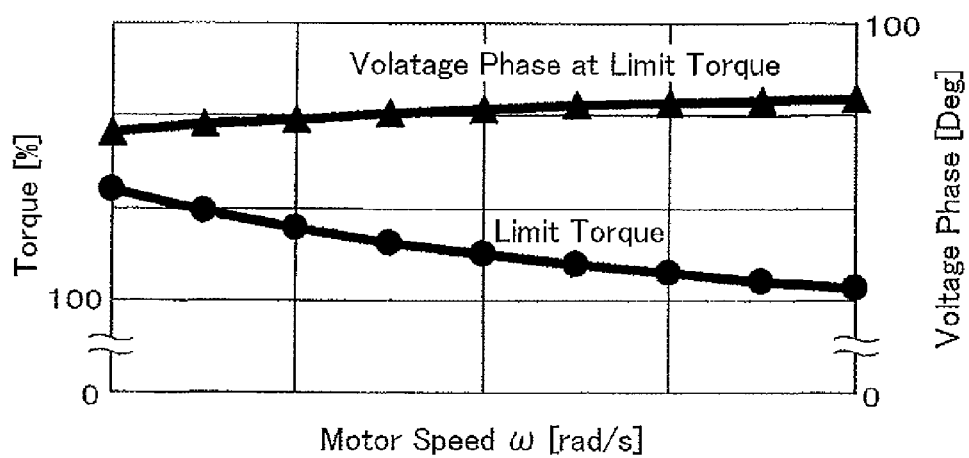
FIG. 4 is a chart showing a relationship among speed, critical torque and voltage phase.

FIG. 4 shows a relationship among the speed ft), the critical torque and the voltage phase (during the critical torque).

It can be seen from the figure that the larger the speed, the smaller the upper limit torque becomes and the larger the voltage phase indicated by Equation 8 become.

That is, it is possible to determine (estimate) from the degree of the voltage phase $\delta$ if the output of the magnetic motor 1 has increased the output torque to the critical torque. This threshold value is the signal $\delta lmt$ 164 and may be preset by studying it by means of numerical analysis and an actual apparatus in advance.

If the value of the DC voltage $E_{dc}$ is more or less constant, the value of the voltage phase during the maximum speed and critical torque may be preset as the signal $\delta lmt$.

If the value of $E_{DC}$ frequently changes, the threshold value may be output as a map for reading the signal $\delta lmt$ by $E_{DC}$.

The signal $\delta$ and the signal $\delta lmt$ are inputted to the comparing section 165 that outputs the voltage phase limiting flag $\delta lmt_{flg}$ of "0" or "1" according to Equation 9.

$$\begin{pmatrix} \delta lmt > \delta : \delta lmt_{flg} = 0 \\ \delta lmt \leq \delta : \delta lmt_{flg} = 1 \end{pmatrix} \qquad \text{Eq. 9}$$

Figure 5:
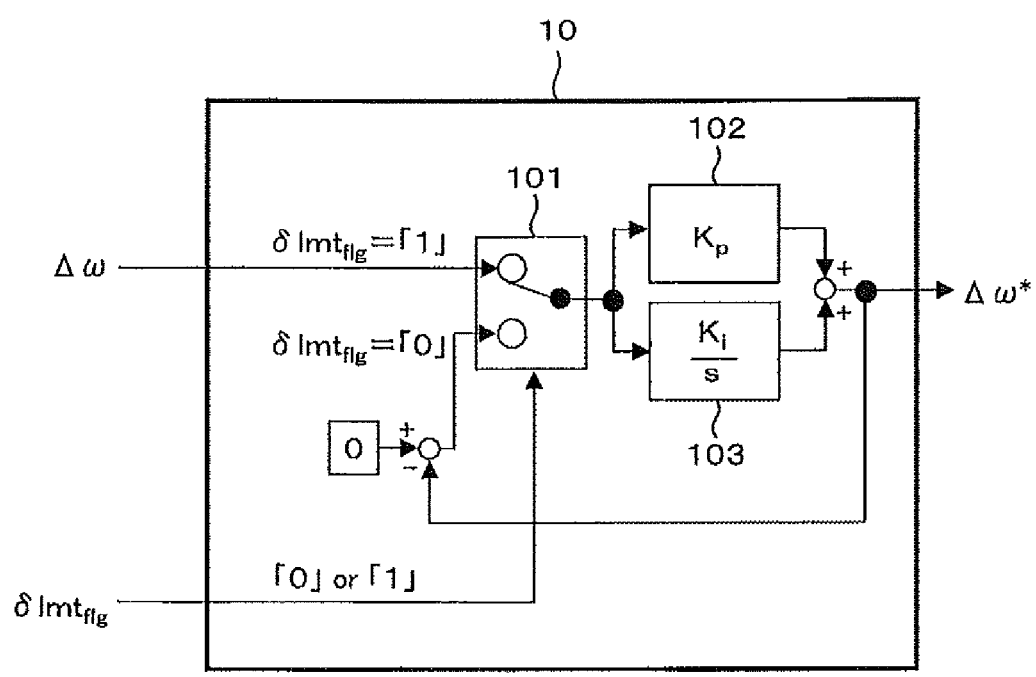
FIG. 5 is a block diagram showing a configuration of a speed command correction calculating section of the invention.

Next, the speed command correction calculating section 10 shown in FIG. 5 will be explained.

The speed deviation value $\Delta\omega$ and the voltage phase limiting flag $\delta lmt_{flg}$ described above are inputted to a switching section 101 to select an output signal according to Equation 10.

$$\begin{pmatrix} \delta lmt_{flg} = 0 : 0 - \Delta\omega \\ \delta lmt_{flg} = 1 : \Delta\omega \end{pmatrix} \qquad \text{Eq. 10}$$

The output signal of the switching section 101 is inputted to a proportion calculating section 102 in which a proportional constant is $K_p$ and to an integration calculating section 103 in which an integration constant is $K_j$ and an added value of output signals of the proportion and integration calculating sections 102 and 103 is outputted as the speed correction value $\Delta\omega^*$.

That is, the following operations are carried out:
$\delta lmt_{flg}$="0": less than the critical torque, so that no correction of the commanded speed value is made ($\Delta\omega^*=0$)
$\delta lmt_{flg}$="1": reach to the critical torque, so that the commanded speed value is corrected (calculate $\Delta\omega^*$)

The adding section 11 calculates the second commanded speed value $\omega^*$ by using the first commanded speed value $\omega^{**}$ and the speed correction value $\Delta\omega^*$ according to Equation 11. The calculated $\omega^*$ is inputted to the speed control calculation section 9 as an input signal:

$$\omega^* = \omega_0^* + \Delta\omega^* \qquad \text{Eq. 11}$$

Figure 6A:
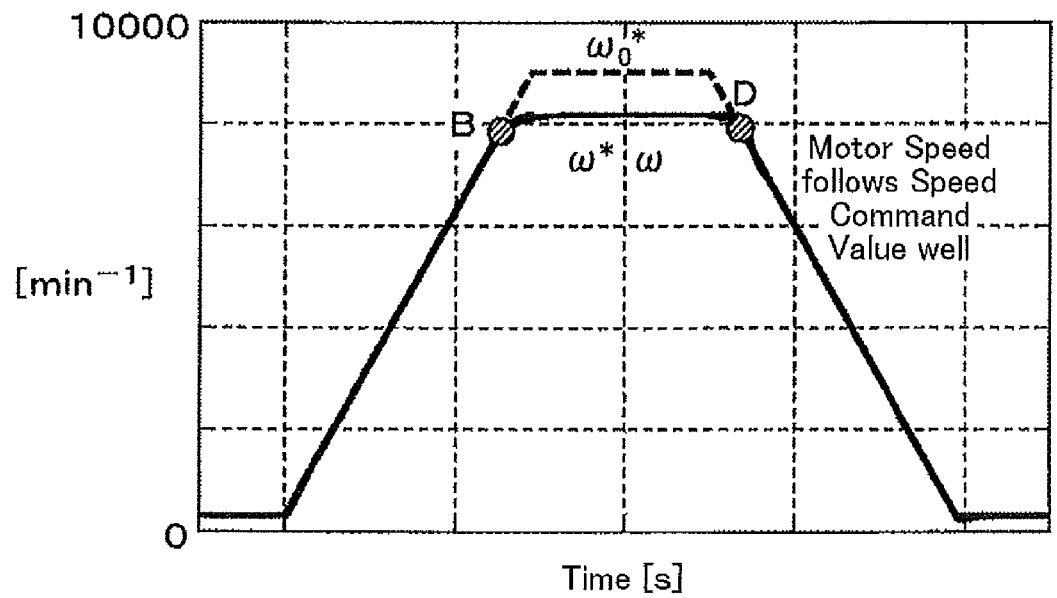
FIG. 6A shows a wave form of the estimated speed value when a trapezoidal wave signal of the commanded speed value is applied with the speed command correction calculating section and "the voltage limit detecting section of the present invention are being used.
Figure 6B:
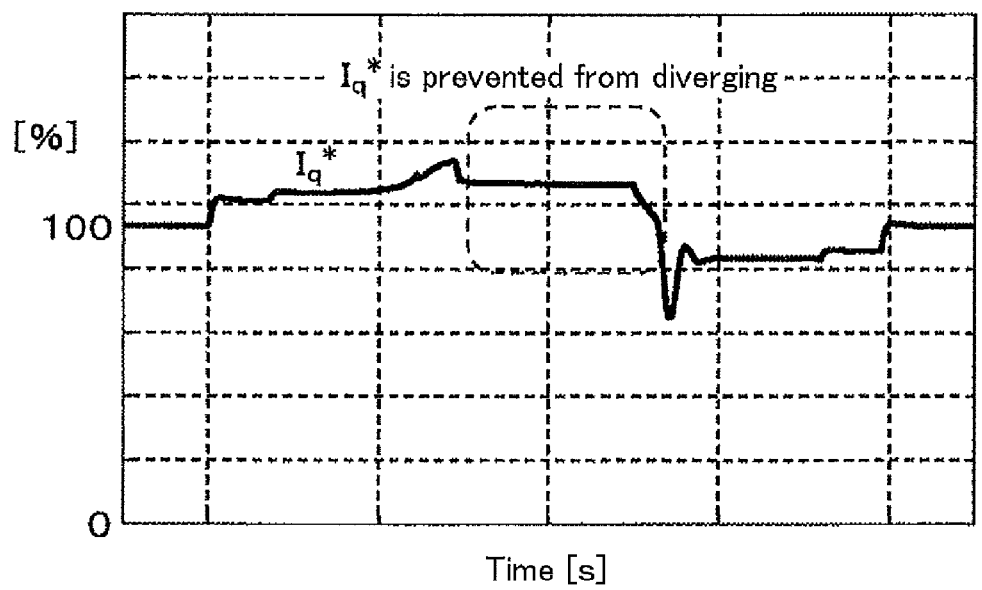
FIG. 6B shows a waveform of the q-axis commanded current value when a trapezoidal wave signal of the commanded speed value is applied when a trapezoidal wave signal of the commanded speed value is applied with the speed command correction calculating section and "the voltage limit detecting section of the present invention are being used.

FIG. 6 shows control characteristics when "the speed command correction calculating section 10" and "the voltage limit detecting section 16" of the present invention are employed.

Although the speed ω stagnates on and above the point B in the middle of acceleration and the q-axis commanded current value $I_q^*$ is dispersed in the prior art case shown in FIG. 2, it can be seen from FIG. 6 that it is possible to prevent $I_q^*$ from diverging by decelerating the first commanded speed value $\omega_0^*$ to the second commanded speed value $\omega^*$ and as a consequence, favorable following characteristic even near the point D is realized.

Second Embodiment

While the first embodiment has been the method for correcting the first commanded speed value $\omega_0^*$ by using the speed correction value $\Delta\omega^*$, the estimated speed value $\omega_{1e}$ may be corrected by using the speed correction value $\Delta\omega^*$.

FIG. 7 shows this embodiment.

In this figure, each of the components 1 through 10 and 12 through 17 corresponds to one with the same number in FIG. 1.

A subtracting section 11a outputs the second estimated speed value $\omega_{1c}$ by using the estimated speed value $\omega_{1c}$ and the speed correction value $\Delta\omega^*$ according to Equation 12.

$$\omega_{1c}' = \omega_{1c} + \Delta\omega^* \qquad \text{Eq. 12}$$

It is obvious that even if the second estimated speed value $\omega_{1c}'$ is inputted to the speed control calculation section 9 as an input signal, the present embodiment operates in the same manner as the embodiment described above and brings about the same effects.

Third Embodiment

Figure 8:
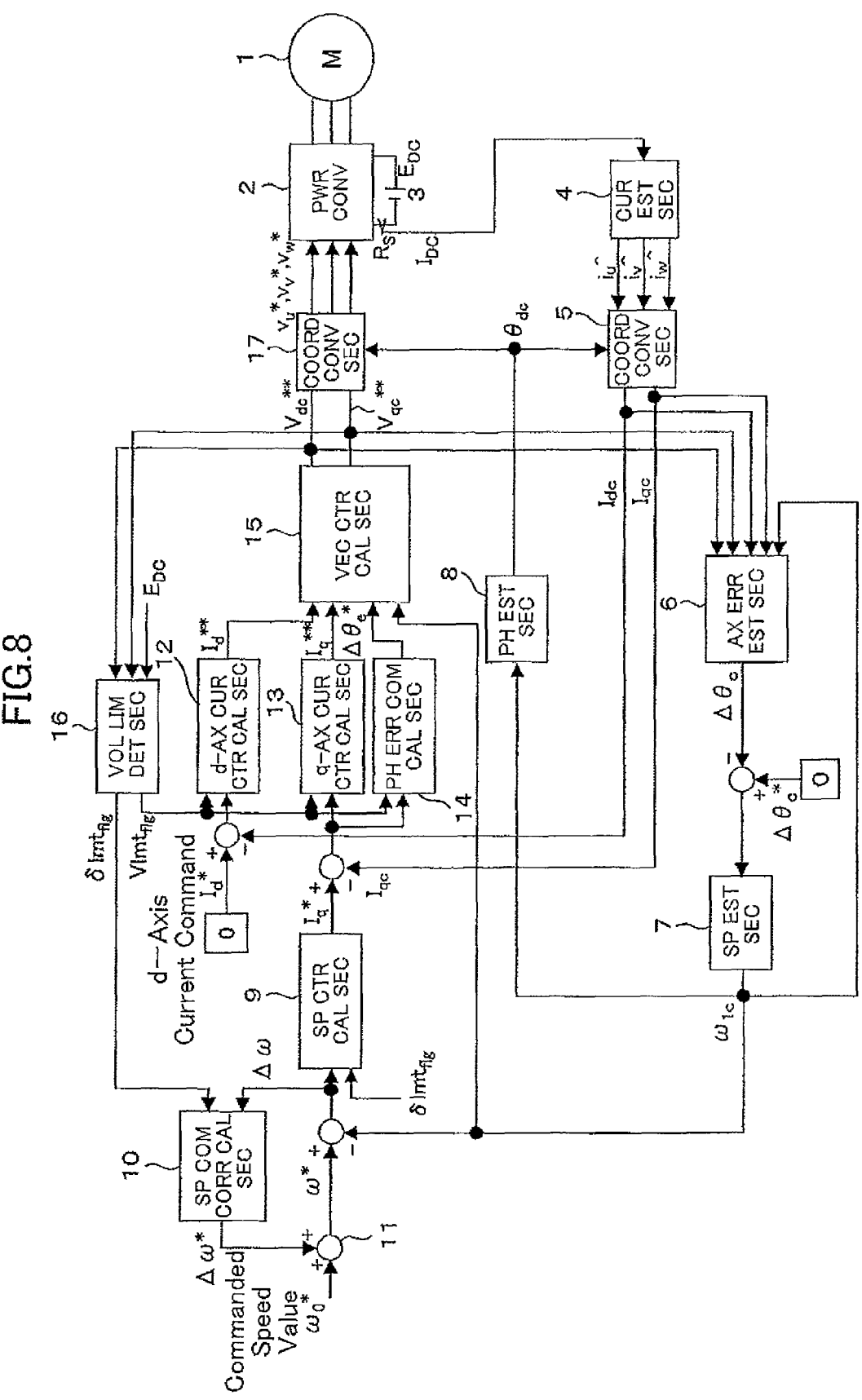
FIG. 8 is a block diagram illustrating a configuration of a speed controller of a magnetic motor according to a still other embodiment of the invention.

FIG. 8 shows a still other embodiment of the invention.

While the first commanded speed value or the detected speed value has been corrected by using the speed correction value in the first and second embodiments, the input signal of the speed control calculation section 9 is limited by using information limiting the voltage phase.

In FIG. 8, the components 1 through 8 and 10 through 17 are the same with those in FIG. 1.

A speed control calculation section 9a outputs the q-axis commanded current value $I_q^*$ by using the speed deviation value $\Delta\omega$ and the voltage phase limiting flag $\delta lmt_{flg}$.

Figure 9:
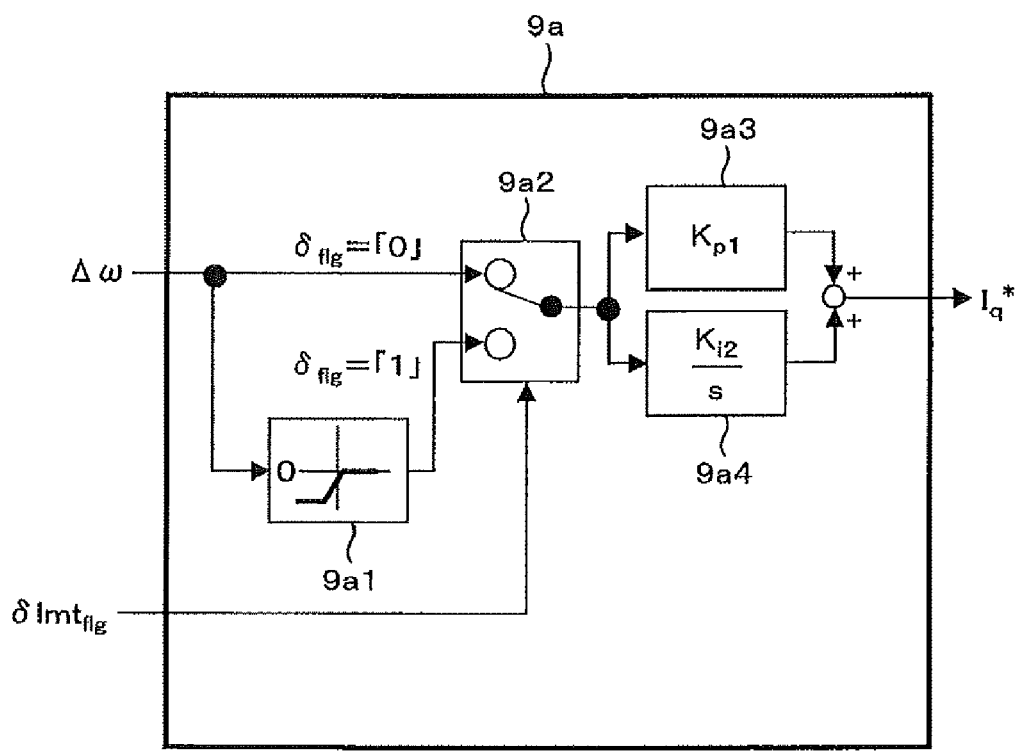
FIG. 9 is a block diagram showing a configuration of a speed control calculation section of the invention.

Next, the speed control calculation section 9a will be explained with reference to FIG. 9.

The speed deviation value $\Delta\omega$ is inputted to a speed deviation limiting section 9a1 that outputs a signal according to Equation 13.

$$\begin{pmatrix} \Delta\omega \geq 0 : \Delta\omega' = 0 \\ \Delta\omega < 0 : \Delta\omega' = \Delta\omega \end{pmatrix} \qquad \text{Eq. 13}$$

The speed deviation value $\Delta\omega$, the signal $\Delta\omega'$ and the voltage phase limiting flag $\delta lmt_{flg}$ are inputted to a switching section 9a2 to select an output signal according to Equation 14.

$$\begin{pmatrix} \delta lmt_{flg} = 0 : \Delta\omega \\ \delta lmt_{flg} = 1 : \Delta\omega' \end{pmatrix} \qquad \text{Eq. 14}$$

The output signal of the switching section 9a2 is inputted to a proportion calculating section 9a3 in which a proportional constant is $K_{pl}$ and to an integration calculating section 9a4 in which an integration constant is $K_{il}$ and an added value of output signals of the proportion and integration calculating sections 9a3 and 9a4 is outputted as a q-axis commanded current value $I_q^*$.

That is, the following operations are carried out in the present embodiment:

$\delta lmt_{flg}$="0": less than the critical torque, so that no correction of $I_q^*$ is made (no limit)

$\delta lmt_{flg}$="1": reach to the critical torque, so that $I_q^*$ is corrected (positive-side input is limit)

It is apparent that the present embodiment operates in the same manner with the embodiment described above and brings about the same effects.

It is noted that although only the positive-side of the signal inputted to the both proportion and integration calculating sections 9a3 and 9a4 is limited when $\delta lmt_{flg}$="1" in the present embodiment, it is also possible to limit the positive-side of the input signal of only the integration calculating section 9a4.

Fourth Embodiment

Figure 10:
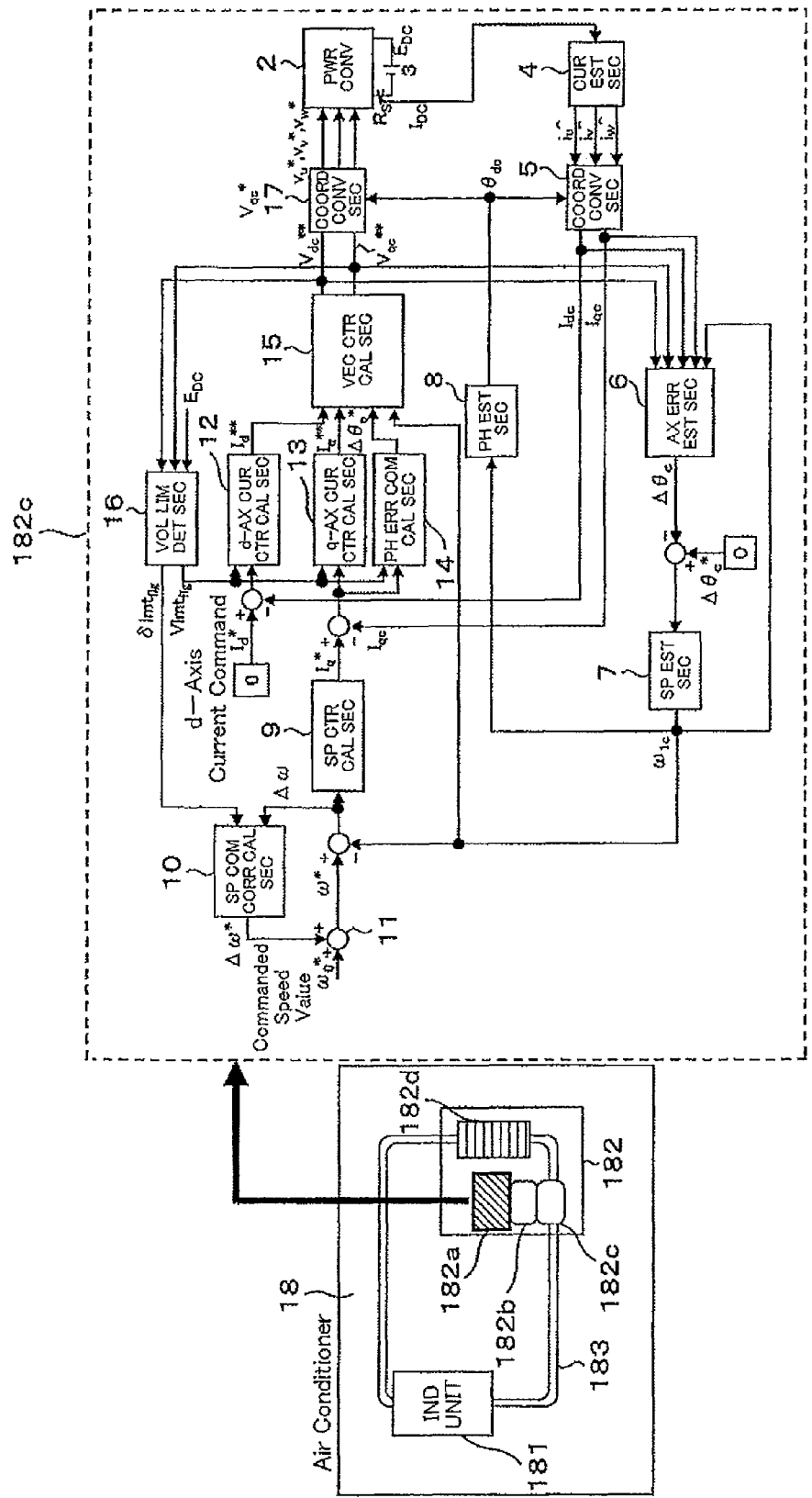
FIG. 10 is a block diagram of the speed controller of the magnetic motor of the invention applied to an air conditioner.

FIG. 10 shows a different embodiment of the invention.

In this embodiment the present invention is applied to an air conditioner.

Each of the components 1 through 17 in the figure corresponds to one with the same number in FIG. 1.

A structure of the air conditioner 18 will be explained below.

The air conditioner 18 is composed of an indoor unit (IND UNIT) 181, an outdoor unit 182 and a pipe 183.

Within the outdoor unit 182, a power converter controller 182a controls a magnetic motor 182b to drive a compressor 182c that compresses refrigerant.

The components 1 through 17 in FIG. 1 are installed in the air conditioner with software and hardware circuits.

The air conditioner having the highly efficient and quick response control characteristics may be completed by thus applying the invention to the air conditioner.

Fifth Embodiment

Figure 11:
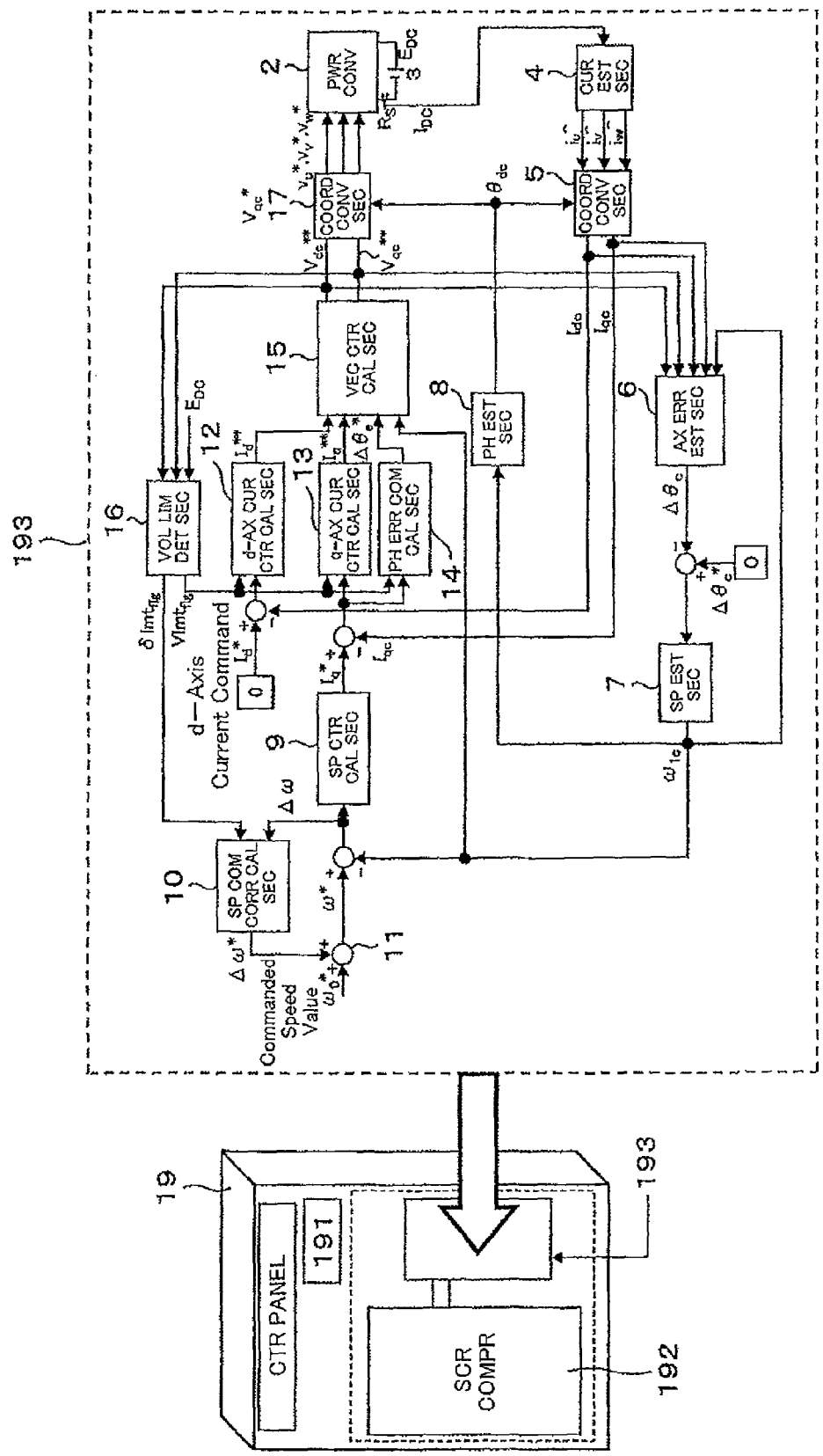
FIG. 11 is a block diagram of the speed controller of the magnetic motor of the invention applied to a screw compressor.

FIG. 11 shows another embodiment of the invention.

In this embodiment the present the invention is applied to a screw compressor.

In the figure, the components 1 through 17 are the same with those in FIG. 1.

A construction of the screw compressor 19 will be now described.

A screw compressor (SCR COMPR) 192 containing the magnetic motor 1 receives the commanded speed value $\omega^*$ from a control panel 191 and is controlled and driven by a power converter controller 193.

The components 1 through 17 in FIG. 1 are installed in the screw compressor with software and hardware circuits.

The screw compressor having the highly efficient and quick response control characteristics may be completed by thus applying the invention to the screw compressor.

It is noted that while the second commanded current values $I_d^{}$ and $I_q^{}$ are generated from the first commanded current values $I_d^*$ and $I_q^*$ and the detected current values $I_{dc}$ and $I_{qc}$ and the vector control calculation is carried out by using the second commanded current values so far in the first through third embodiments, the invention is applicable also to a vector control method of generating voltage correction values $\Delta V_d$ and $\Delta V_q$ from the first commanded current values $I_d^*$ and $I_q^*$ and the detected current values $I_{dc}$ and $I_{qc}$ and calculating commanded voltage values $V_{dc}^{}$ and $V_{qc}^{}$ by using the voltage correction values, the first commanded current values $I_d^*$ and $I_q^*$, the estimated speed value $\omega_{1c}$ and the constant of the magnetic motor 1 according to Equation 15.

$$\begin{bmatrix} V_{dc}^{} \\ V_{qc}^{} \end{bmatrix} = \begin{bmatrix} R^* & -\omega_{1c} \cdot L_q^* \\ \omega_{1c} \cdot L_d^* & R^* \end{bmatrix} \cdot \begin{bmatrix} I_d^* \\ I_q^* \end{bmatrix} + \begin{bmatrix} 0 \\ \omega_{1c} \cdot K_e^* \end{bmatrix} + \begin{bmatrix} \Delta V_d \\ \Delta V_q \end{bmatrix} \quad \text{Eq. 15}$$

Still more, the three-phase motor currents are reproduced from the DC current $I_{DC}$ flowing through the one-shunt resistance $R_s$ attached for detecting over-current of the power converter 2 and the reproduced currents $\hat{i}_u$, $\hat{i}_v$ and $\hat{i}_w$ are used for the control in the first through third embodiments, AC currents $i_u$, $i_v$ and $i_w$ directly detected by the current detector may be also applied.

Further, while position sensor-less control from which positional information of the magnetic motor 1 is cut has been used in the first through third embodiments, it is possible to apply position θ detected by an encoder, a resolver, a magnetic pole position sensor and others that are capable of directly detecting the position.

In these cases, the speed ω may be calculated according to Equation 16.

$$\omega = \frac{d}{dt} \cdot \theta \quad \text{Eq. 16}$$

As described above, the invention can provide the highly stable and highly efficient magnetic motor.

What is claimed:

1. A method of controlling a magnetic motor comprising the steps of:
   calculating d-axis and q-axis commanded voltage values, the d-axis and the q-axis corresponding respectively to a magnetic flux axis and a torque axis, and the d-axis and q-axis commanded voltage values being calculated based on d-axis and q-axis commanded current values, d-axis and q-axis detected current values and a detected speed values, the d-axis commanded current value set to zero and the q-axis commanded current value calculated from a deviation of a commanded speed value from the detected speed value;
   controlling an output voltage value from a power converter for driving the magnetic motor in accordance with the calculated d-axis and q-axis commanded voltage values; and
   limiting a speed control input to keep the q-axis commanded current value from increasing to an upper limit value if a commanded torque value to request a greater torque than a maximum torque is requested, the commanded torque value corresponding to the q-axis commanded current value and the maximum torque which corresponds to the maximum detected q-axis current and can be outputted by the magnetic motor.

2. The method of controlling a magnetic motor according to claim 1, further comprising a step of inputting a second commanded speed value to limit the speed control input, the second commanded speed value being equal to what is left after subtracting a speed correction value from a first commanded speed value given by an upper level section, the speed correction value being calculated so as to have the second commanded speed value equal to the detected speed value.

3. The method of controlling a magnetic motor according to claim 1, further comprising a step of inputting a second detected speed value to limit the speed control input, the second detected speed value being equal to a summation of the detected speed value and a speed correction value being calculated so as to have the second detected speed value equal to the first commanded speed value.

4. The method of controlling a magnetic motor according to claim 2, wherein the speed correction value is generated by proportion and integration calculations of a deviation of the second commanded speed value from the detected speed value or a deviation of the first commanded speed value from the second detected speed value.

5. The method of controlling a magnetic motor according to claim 1, wherein if the deviation of the commanded speed value from the detected speed value is a positive value, the deviation is made zero with the positive value skipped.

6. The method of controlling a magnetic motor according to claim 1, further comprising a step of determining that a maximum torque has been exceeded if a phase angle between the d-axis commanded voltage value and the q-axis commanded voltage value is equal to or greater than 70 degrees.

7. A method of controlling a magnetic motor comprising the steps of:
   calculating d-axis and q-axis commanded voltage values, the d-axis and the q-axis corresponding respectively to a magnetic flux axis and a torque axis, and the d-axis and q-axis commanded voltage values being calculated based on d-axis and q-axis commanded current values, d-axis and q-axis detected current values and a detected speed values, the d-axis commanded current value set to zero and the q-axis commanded current value calculated from a deviation of a commanded speed value from the detected speed value;
   controlling an output voltage value from a power converter for driving the magnetic motor by changing a commanded phase value in accordance with a deviation of the q-axis commanded current value from the q-axis detected current value if the output voltage value from the power converter is limited; and
   limiting a speed control input to keep the q-axis commanded current value from increasing to an upper limit value if a commanded torque value to request a greater torque than a maximum torque is requested, the commanded torque value corresponding to the q-axis commanded current value and the maximum torque which corresponds to the maximum q-axis detected current and can be outputted by the magnetic motor.

8. The method of controlling a magnetic motor according to claim 7, further comprising a step of inputting a second commanded speed value to limit the speed control input, the second commanded speed value being equal to what is left after subtracting a speed correction value from a first commanded speed value given by an upper level section, the speed correction value being calculated so as to have the second commanded speed value equal to the detected speed value.

9. The method of controlling a magnetic motor according to claim 7, further comprising a step of inputting a second detected speed value to limit the speed control input, the second detected speed value being equal to a summation of the detected speed value and a speed correction value being calculated so as to have the second detected speed value equal to the first commanded speed value.

10. The method of controlling a magnetic motor according to claim 8, wherein the speed correction value is generated by proportion and integration calculations of a deviation of the second commanded speed value from the detected speed value or a deviation of the first commanded speed value from the second detected speed value.

11. The method of controlling a magnetic motor according to claim 7, wherein if the deviation of the commanded speed value from the detected speed value is a positive value, the deviation is made zero with the positive value skipped.

12. The method of controlling a magnetic motor according to claim 7, further comprising a step of determining that a maximum torque has been exceeded if a phase angle between the d-axis commanded voltage value and the q-axis commanded voltage value is equal to or greater than 70 degrees.

13. The method of controlling a magnetic motor according to claim 7, further comprising a step of determining that the output voltage value from the power converter is limited if a ratio of an average value on the output voltage values to a DC voltage value is substantially 1.

* * * * *